United States Patent
Katano

(10) Patent No.: US 11,285,659 B2
(45) Date of Patent: Mar. 29, 2022

(54) METHOD OF MANUFACTURING TANK

(71) Applicant: TOYOTA JIDOSHA KABUSHIKI KAISHA, Toyota (JP)

(72) Inventor: Koji Katano, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/005,633

(22) Filed: Aug. 28, 2020

(65) Prior Publication Data

US 2021/0078238 A1 Mar. 18, 2021

(30) Foreign Application Priority Data

Sep. 13, 2019 (JP) .............................. JP2019-166854

(51) Int. Cl.
*B29C 53/60* (2006.01)
*B29C 53/58* (2006.01)
*B29C 53/84* (2006.01)
*B29C 53/56* (2006.01)
*B29K 101/10* (2006.01)
*B29L 31/00* (2006.01)

(52) U.S. Cl.
CPC .......... *B29C 53/583* (2013.01); *B29C 53/566* (2013.01); *B29C 53/845* (2013.01); *B29K 2101/10* (2013.01); *B29L 2031/7172* (2013.01)

(58) Field of Classification Search
None
See application file for complete search history.

(56) References Cited

U.S. PATENT DOCUMENTS

| 3,100,171 | A | * | 8/1963 | Hardesty | ................ B64D 37/10 |
| | | | | | 156/165 |
| 3,449,182 | A | * | 6/1969 | Wiltshire | ............... B29C 53/824 |
| | | | | | 156/69 |
| 2018/0290537 | A1 | | 10/2018 | Ueda | |

FOREIGN PATENT DOCUMENTS

| JP | 2017096334 A | 6/2017 |
| JP | 2017219181 A | 12/2017 |
| JP | 2018179081 A | 11/2018 |

* cited by examiner

*Primary Examiner* — Jeffry H Aftergut
(74) *Attorney, Agent, or Firm* — Dickinson Wright, PLLC

(57) ABSTRACT

A method of manufacturing a tank includes: a winding step of winding a fiber impregnated with thermosetting resin before curing on a liner; a shape changing step of making the shape of the liner larger than the shape thereof at the time of the winding step, the shape changing step being performed after the winding step; and a curing step of heating and curing the thermosetting resin while the shape of the liner is increased by the shape changing step.

6 Claims, 5 Drawing Sheets

METHOD OF MANUFACTURING TANK

CROSS-REFERENCE TO RELATED APPLICATIONS

This application claims priority from Japanese patent application No. 2019-166854 filed on Sep. 13, 2019, the disclosure of which is hereby incorporated in its entirety by reference into this application.

BACKGROUND

Field

This disclosure relates to a technique of a method of manufacturing a tank.

Related Art

In a method of manufacturing a tank conventionally known, a reinforcing layer before curing is formed by winding a fiber impregnated with thermosetting resin on a liner, and a reinforcing layer is formed by heating and curing the thermosetting resin (Japanese Patent Application Publication No. 2018-179081).

In winding the fiber on the liner, a site of a slack might be caused in the wound fiber as a result of a condition for the winding or the shape of the liner, for example. If the thermosetting resin is cured with the slack present in the fiber, the slack in the fiber is present in the resultant reinforcing layer.

SUMMARY

According to a first aspect of this disclosure, a method of manufacturing a tank is provided. The method of manufacturing the tank includes: a winding step of winding a fiber impregnated with thermosetting resin before curing on a liner; a shape changing step of making the shape of the liner larger than the shape thereof at the time of the winding step, the shape changing step being performed after the winding step; and a curing step of heating and curing the thermosetting resin while the shape of the liner is increased by the shape changing step.

DETAILED DESCRIPTION

A. Embodiment

Figure 1:
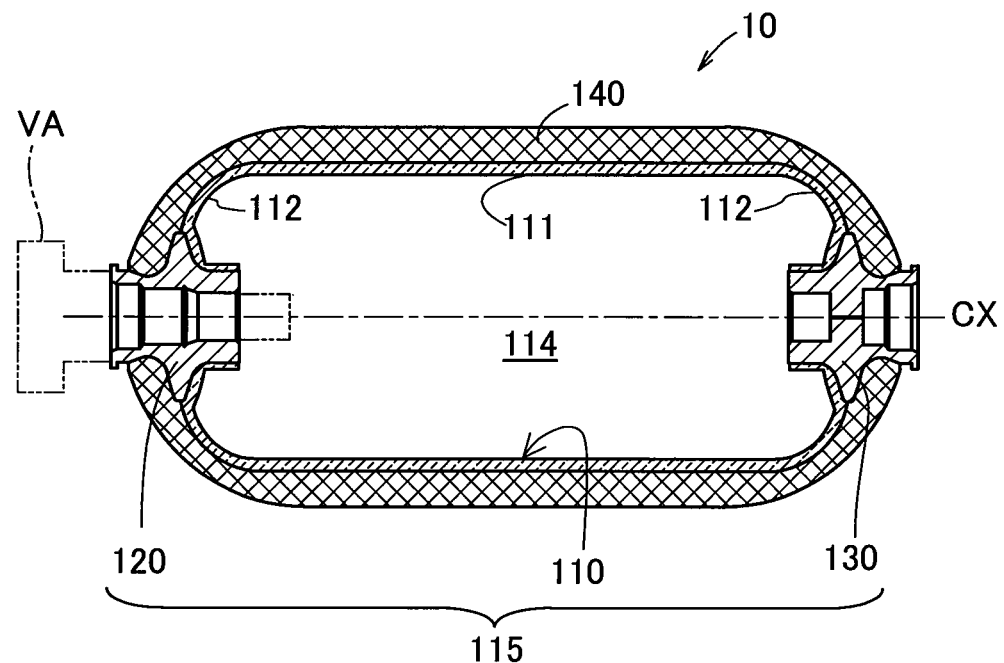
FIG. 1 is a schematic sectional view schematically showing the configuration of a tank.

FIG. 1 is a schematic sectional view schematically showing the configuration of a tank manufactured by a manufacturing method according to an embodiment of this disclosure. For example, a tank 10 is a high-pressure gas tank storing hydrogen in a compressed state to be supplied to a fuel cell. Internal pressure in the tank 10 storing hydrogen is equal to or greater than 35 MPa, for example. The tank 10 includes a tank body 115 and a reinforcing layer 140 covering the tank body 115. The tank body 115 includes a liner 110, a first ferrule 120, and a second ferrule 130.

The liner 110 is made of synthetic resin such as nylon or polyethylene. In this embodiment, the liner 110 is made of nylon. The liner 110 is a hollow container with a liner axis CX and forms storage space 114 therein for storing gas. The liner 110 includes a cylindrical section 111 having a substantially cylindrical shape, and dome sections 112 having substantially semispherical shapes connected to opposite ends of the cylindrical section 111 in a direction along the liner axis CX. In other embodiments, the liner 110 may be made of metal.

The reinforcing layer 140 is arranged in such a manner as to cover the liner 110 and peripheral parts of the first ferrule 120 and the second ferrule 130 except opening parts thereof pointed in a direction of the liner axis CX. The reinforcing layer 140 is made of fiber reinforced resin. In this embodiment, the reinforcing layer 140 is made of carbon fiber reinforced resin (CFRP) that is a composite material of thermosetting resin and a carbon fiber. Epoxy resin is used as the thermosetting resin. The thermosetting resin is not limited to epoxy resin but other types of thermosetting resin such as unsaturated polyester resin may be used.

The first ferrule 120 and the second ferrule 130 are made of metal such as aluminum or aluminum alloy or a high-strength resin, and are provided at the dome sections 112 of the liner 110. The opening part of each of the first ferrule 120 and the second ferrule 130 has an inner peripheral surface provided with a female screw. A male screw as a functional part such as a pipe or a valve assembly is threadedly engaged with the female screw to connect the functional part to the first ferrule 120 or the second ferrule 130. In FIG. 1, a valve assembly VA indicated by two-dot chain lines is connected to the first ferrule 120. In this embodiment, the second ferrule 130 is formed in such a manner that the storage space 114 and the outside are in a non-communicating state.

If the tank 10 is incorporated as an element of a fuel cell system, the storage space 114 becomes connected to a gas flow path not shown in the drawings via the valve assembly VA. The storage space 114 is filled with hydrogen as fuel gas. Hydrogen is supplied from the storage space 114 toward a fuel cell to be used for power generation by the fuel cell.

Figure 2:
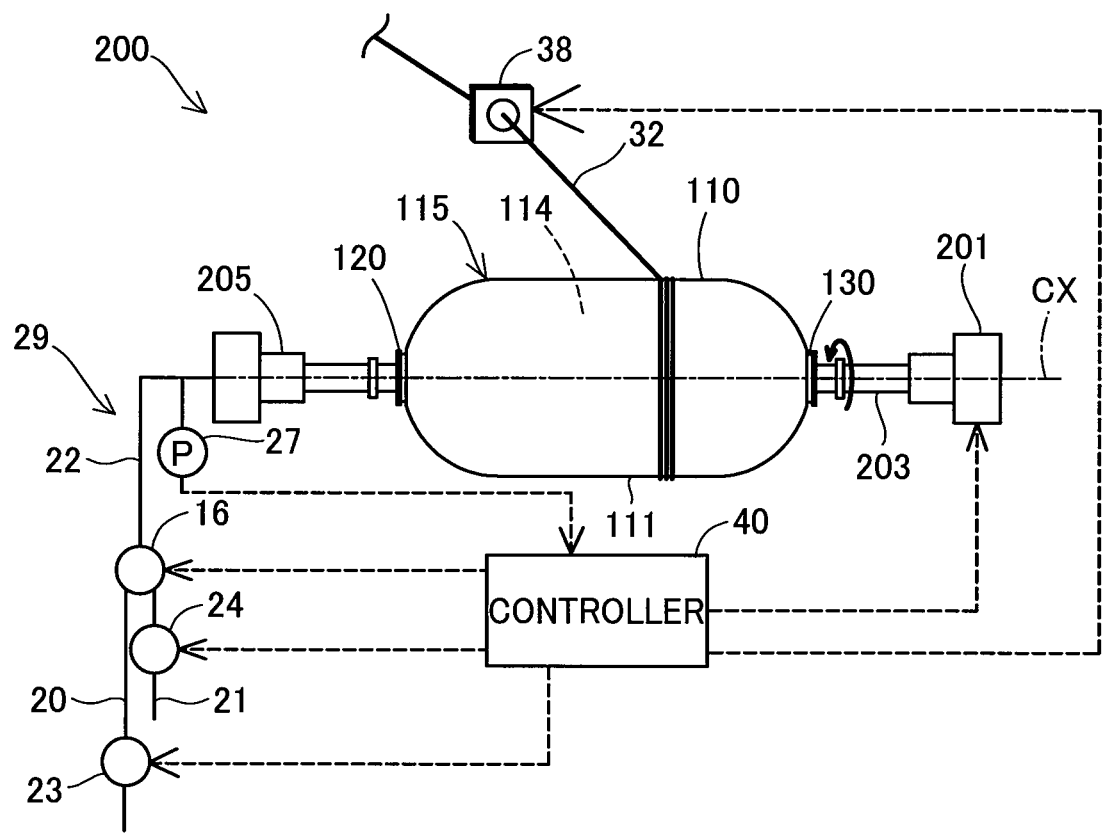
FIG. 2 is a view for describing a winding device of winding a fiber.

FIG. 2 is a view for describing a winding device 200 of winding a fiber 32. The winding device 200 includes a rotating unit 201, a rotary shaft 203, a support shaft 205, a fiber guide unit 38, an internal pressure adjusting mechanism 29, and a controller 40. The controller 40 controls the operation of the winding device 200. The fiber guide unit 38 feeds the fiber 32 impregnated with thermosetting resin toward the tank body 115. The fiber guide unit 38 adjusts an angle of winding of the fiber 32.

The rotating unit 201 is coupled to the rotary shaft 203 and is driven by a command from the controller 40, thereby rotating the rotary shaft 203. The rotary shaft 203 is fixed to the second ferrule 130 and rotates the tank body 115. The support shaft 205 is attached to the first ferrule 120 in a manner allowing rotation of the tank body 115. The support shaft 205 has a tubular shape.

The fiber 32 is wound on the tank body 115 by supplying the fiber 32 from the fiber guide unit 38 to the tank body 115 while rotating the tank body 115 about the liner axis CX using the rotating unit 201. The fiber 32 is wound on the tank body 115 by hoop winding or helical winding. The hoop winding is a way of winding the fiber 32 by which an angle between the liner axis CX and a direction of winding the fiber 32 becomes a substantially right angle. The "substantially right angle" mentioned herein includes both an angle of 90° and angles around 90° that might be defined by shifting a position of winding of the fiber 32 with the intention of avoiding an overlap between parts of the fiber 32. The hoop winding is used in winding the fiber 32 on the cylindrical section 111.

The helical winding includes high-angle helical winding and low-angle helical winding. The high-angle helical winding is a way of winding the fiber 32 on the cylindrical section 111 of the liner 110 by which the liner axis CX and a direction of winding the fiber 32 form any angle in an exemplary range from 75 to 87° (80°, for example). The low-angle helical winding is a way of winding the fiber 32 on the tank body 115 by which the liner axis CX and a direction of winding the fiber 32 form any angle in an exemplary range from 10 to 30° (15°, for example). If the low-angle helical winding is used, the fiber 32 is wound repeatedly into turns of a spiral pattern in such a manner as to extend over the two dome sections 112.

The internal pressure adjusting mechanism 29 includes a pressure adjusting flow path 22, a pressurizing flow path 21, a pressure reducing flow path 20, a switch valve 16, a pressure reducing pump 23, and a pressurizing pump 24. Each of the flow paths 20, 21, and 22 are configured using a pipe. The pressure adjusting flow path 22 is a flow path for communication between the outside and the storage space 114 in the tank body 115 and is partially arranged in the support shaft 205. A pressure sensor 27 is arranged in the pressure adjusting flow path 22. A detection value from the pressure sensor 27 is output to the controller 40. In this embodiment, a detection value from the pressure sensor 27 is regarded as internal pressure in the liner 110.

The pressure reducing flow path 20 is a flow path communicating with the pressure adjusting flow path 22 via the switch valve 16 and is a flow path for reducing pressure in the storage space 114, namely, internal pressure in the liner 110. The pressure reducing pump 23 is arranged in the pressure reducing flow path 20. The pressure reducing pump 23 is driven by a command from the controller 40 to exhaust gas in the storage space 114 to the outside via the pressure adjusting flow path 22 and the pressure reducing flow path 20, thereby reducing pressure in the storage space 114.

The pressurizing flow path 21 is a flow path communicating with the pressure adjusting flow path 22 via the switch valve 16 and is a flow path for increasing pressure in the storage space 114, namely, for increasing the internal pressure in the liner 110. The pressurizing pump 24 is arranged in the pressurizing flow path 21. The pressurizing pump 24 is driven by a command from the controller 40 to feed gas into the storage space 114 via the pressure adjusting flow path 22 and the pressurizing flow path 21, thereby increasing pressure in the storage space 114. In this embodiment, the pressure reducing flow path 20 has one end to which a gas container (not shown in the drawings) storing gas to be fed to the storage space 114 is connected. Gas for increasing pressure in the storage space 114 is preferably inert gas for suppressing oxidation of the liner 110. In this embodiment, nitrogen is used as the inert gas.

The switch valve 16 changes a state of communication between the pressure adjusting flow path 22 and the pressure reducing flow path 20 or a state of communication between the pressure adjusting flow path 22 and the pressurizing flow path 21 in response to a command from the controller 40. All the pressure adjusting flow path 22, the pressurizing flow path 21, and the pressure reducing flow path 20 are closable using the switch valve 16.

Figure 3:
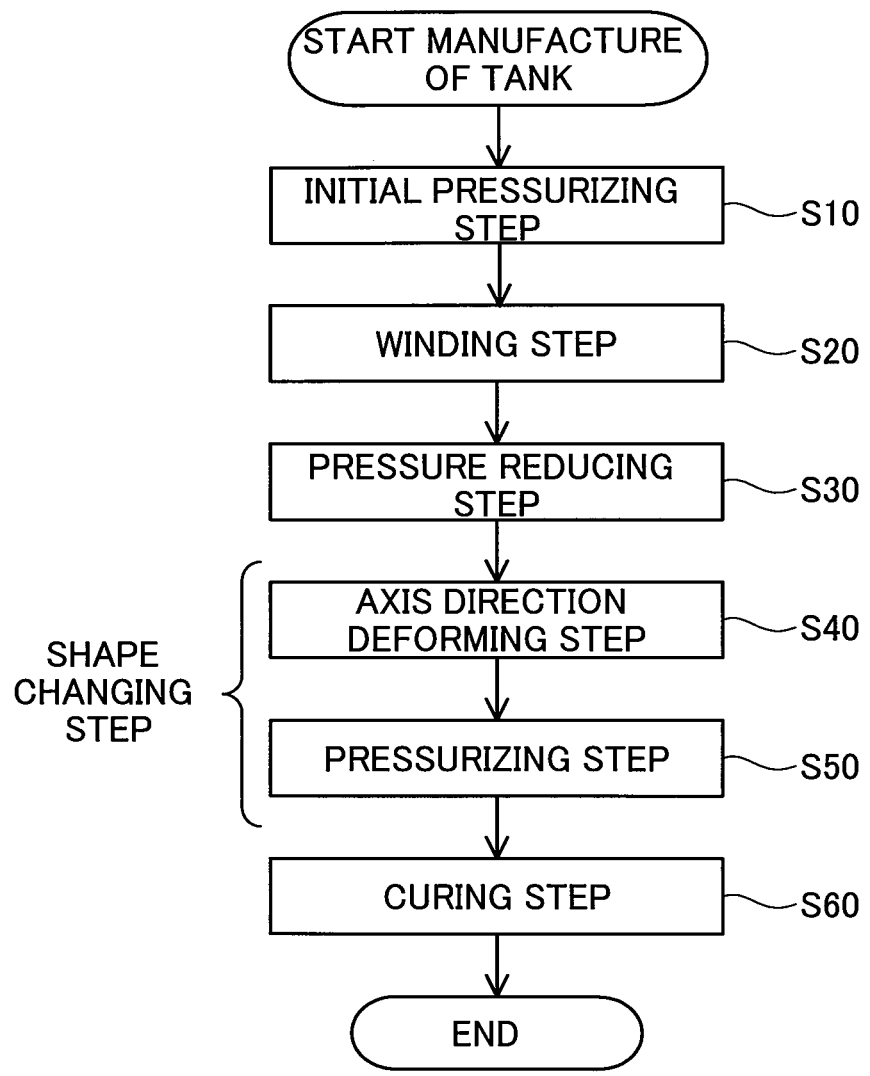
FIG. 3 is a flowchart showing a method of manufacturing the tank.
Figure 4:
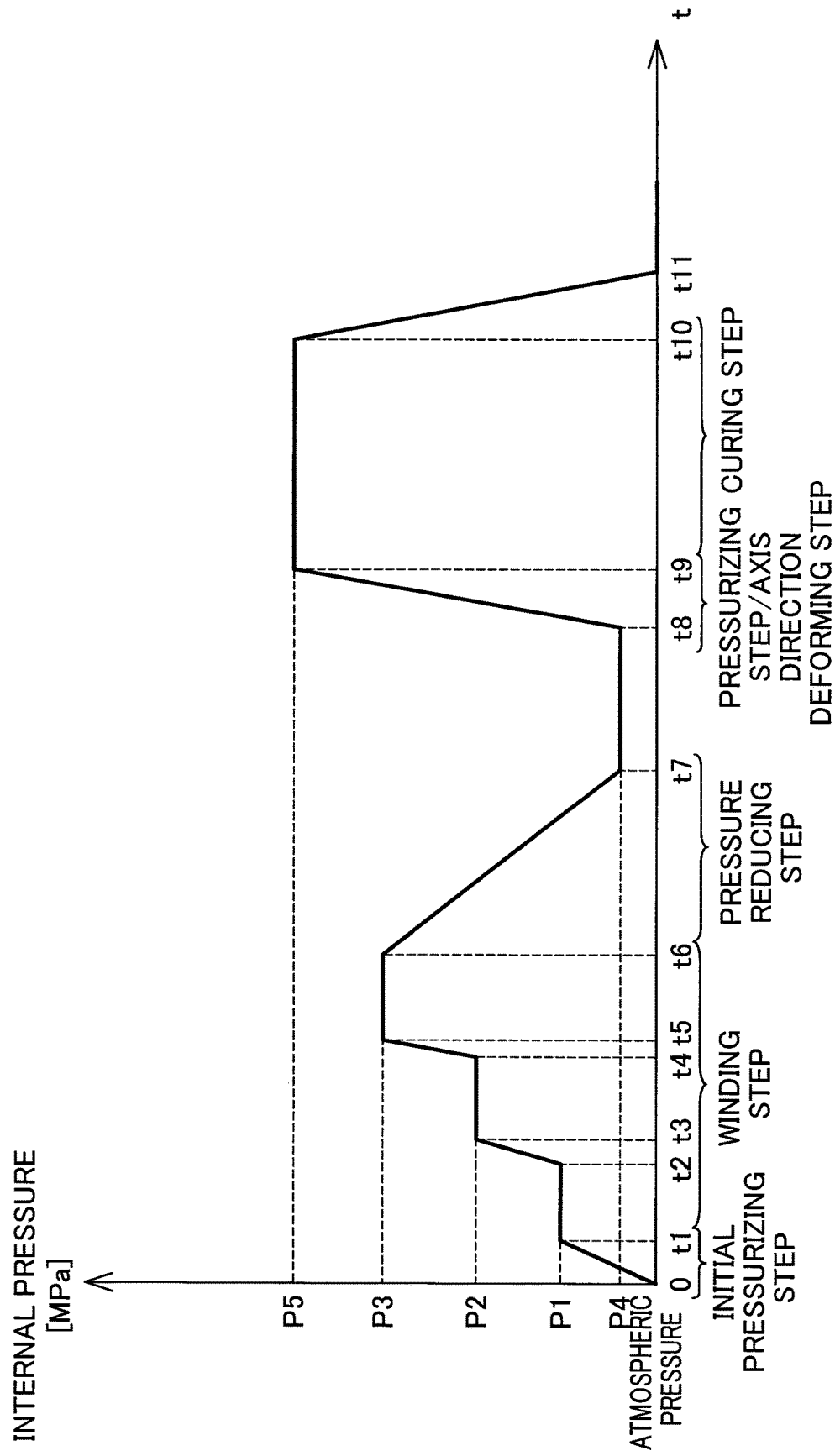
FIG. 4 is a view showing a relationship between internal pressure in a liner and each step of the manufacturing method.

FIG. 3 is a flowchart showing a method of manufacturing the tank 10. FIG. 4 is a view showing a relationship between the internal pressure in the liner 110 and each step of the manufacturing method. As shown in FIG. 3, the controller 40 performs an initial pressurizing step (step S10). As shown in FIG. 4, the initial pressurizing step is a step of increasing the internal pressure in the liner 110 to first pressure P1 higher than atmospheric pressure by controlling the internal pressure adjusting mechanism 29 and feeding pressurized gas into the storage space 114. The first pressure P1 is preferably set at such a value as to reduce large deformation of the liner 110 to be caused by load from the fiber 32 during winding of the fiber 32 on the liner 110 in a winding step described later.

If a detection value from the pressure sensor 27 becomes equal to the first pressure P1, the controller 40 controls the fiber guide unit 38 and the rotating unit 201 to perform the winding step (step S20 in FIG. 3). The winding step is a step of winding the fiber 32 impregnated with thermosetting resin before curing on the tank body 115 including the liner 110. For winding of the fiber 32, the hoop winding, the high-angle helical winding, and the low-angle helical winding are used in combination. As a result of the winding step, a plurality of layers composed of the fiber 32 impregnated with the thermosetting resin before curing is formed on the tank body 115.

As shown in FIG. 4, during winding of the fiber 32 in the winding step, the controller 40 increases the internal pressure in the liner 110 further from the first pressure P1 for suppressing large deformation of the liner 110 to be caused by load from the fiber 32 wound on the liner 110. In this embodiment, the controller 40 increases the internal pressure in the liner 110 from the first pressure P1 to second pressure P2 with predetermined first timing, and then increases the internal pressure from the second pressure P2 to third pressure P3 with predetermined second timing.

As shown in FIG. 3, after step S20, the controller 40 performs a pressure reducing step (step S30). As shown in FIG. 4, the pressure reducing step is performed between the winding step and a shape changing step described later. In the pressure reducing step, the internal pressure in the liner 110 is reduced from the internal pressure in the liner 110 at the time of the winding step to make the shape of the liner 110 (in particular, the shape in a radial direction) smaller than the shape thereof at the time of the winding step. In this embodiment, in the pressure reducing step, the internal pressure in the liner 110 is reduced to be lower than the third pressure P3 as maximum internal pressure at the time of the winding step. In the pressure reducing step, the controller 40 operates the switch valve 16 to form a state of communication between the pressure adjusting flow path 22 and the pressure reducing flow path 20. Then, the controller 40 drives the pressure reducing pump 23 to exhaust gas in the storage space 114 to the outside. This reduces the internal pressure in the liner 110 to pressure lower than the third pressure P3. As long as the internal pressure in the liner 110 is reduced to a value lower than the third pressure P3, a target value of the internal pressure in the pressure reducing step is not limited to the foregoing value but it may be atmospheric pressure, for example. In the pressure reducing step, the internal pressure in the liner 110 is preferably reduced to become lower than the internal pressure in the liner 110 at the time of winding of the fiber 32 to form a predetermined layer on the liner 110. A layer to form the predetermined layer is a layer wound in the winding step and to be subjected to application of maximum stress (maximum stress layer) after manufacture of the tank 10. The maximum stress layer is a layer in which the strain of the fiber 32 becomes maximum in response to filling of the tank 10 with gas in such a manner as to make the internal pressure in the tank 10 become a predefined value (80 MPa, for example) higher than atmospheric pressure. In this embodiment, the maximum stress layer is a layer in the innermost position of those of layers formed by the high-angle helical winding or the hoop winding. For example, the maximum stress layer is the innermost layer among the layers wound at an angle close to the circumferential direction. The internal pressure in the liner 110 at the time of formation of the layer is the first pressure P1. The strain of the fiber 32 may be evaluated from a rate of stretch of the fiber 32 on the basis of time when the internal pressure in the tank 10 is atmospheric pressure, and becomes greater as a rate of the stretch increases. In this way, in this embodiment, the internal pressure is reduced to fourth pressure P4 lower than the first pressure P1 by the pressure reducing step.

As shown in FIG. 3, the controller 40 performs the shape changing step (step S40, step S50) after step S30. The shape changing step is a step of making the shape of the liner 110 larger than the shape thereof at the time of the winding step. In the shape changing step, the shape of the liner 110 becomes larger than the shape thereof at the time of the winding step at least in one of an axis direction along the liner axis CX of the liner 110 and the radial direction of the cylindrical section 111 perpendicular to the axis direction. In this embodiment, the shape changing step includes an axis direction deforming step (step S40) and a pressurizing step (step S50).

The axis direction deforming step is a step of increasing the shape of the liner 110 in the axis direction by applying external force to the liner 110. In the axis direction deforming step, for example, external force is applied using a jig or the like to the first ferrule 120 and the second ferrule 130 in such a manner as to separate the first ferrule 120 and the second ferrule 130 from each other in the axis direction. Applying the external force to the liner 110 via the first ferrule 120 and the second ferrule 130 in this way makes the size of the liner 110 in the axis direction larger than the size thereof before the shape changing step. Alternatively, the size of the liner 110 in the axis direction may be made larger than the size thereof before the shape changing step in response to application of external force by adjusting the position of the support shaft 205 or that of the rotary shaft 203, for example. In the axis direction deforming step, the shape of the liner 110 in the axis direction is increased in a range from approximately 1 to 10 mm, for example. For example, the axis direction deforming step may be performed in a period from time t8 to time t9 in which the pressurizing step is performed as shown in FIG. 4, between the pressure reducing step and the pressurizing step, or after the pressurizing step.

The pressurizing step is a step of increasing the shape of the liner 110 (particularly, the shape in the radial direction). In the pressurizing step, the controller 40 controls the operation of the switch valve 16 to make the pressurizing flow path 21 and the pressure adjusting flow path 22 communicate with each other and then drives the pressurizing pump 24, thereby feeding gas (in this embodiment, nitrogen) into the liner 110. By doing so, in the pressurizing step, the internal pressure in the liner 110 at the time of the winding step is increased to fifth pressure P5 higher than the third pressure P3 as the maximum pressure, for example.

The resultant internal pressure in the liner 110 increases the size of the liner 110 from the size thereof before the pressurizing step, which is the shape of the liner 110 defined mainly in the radial direction. In consideration of safety, the fifth pressure P5 may be equal to or less than 1.0 MPa, for example. The internal pressure is only required to be increased to become higher than the internal pressure at the time of the winding step (first pressure P1 as minimum internal pressure, for example). However, the internal pressure in the liner 110 is preferably increased to become higher than the third pressure P3 as the maximum internal pressure at the time of the winding step, as this makes it possible to reduce an extent of a slack further in the fiber 32 wound in the winding step.

As shown in FIG. 3, a curing step of heating and curing the thermosetting resin is performed (step S60) by heating the tank body 115 on which the fiber 32 impregnated with the thermosetting resin is wound while the shape of the liner 110 is increased by the shape changing step. As shown in FIG. 4, for example, the thermosetting resin is heated to be cured in the curing step while the shape of the liner 110 is increased by maintaining the internal pressure in the liner 110 at the fifth pressure P5 higher than the internal pressure at the time of the winding step. In the curing step, the tank body 115 is arranged in a heating furnace and the fiber impregnated with the thermosetting resin is heated, thereby curing the thermosetting resin. As a result, the tank 10 is manufactured. In this case, the rotary shaft 203, the support shaft 205, and the internal pressure adjusting mechanism 29 are also arranged in the heating furnace partially. The internal pressure in the liner 110 during implementation of the curing step is preferably equal to or greater than the maximum internal pressure (in this embodiment, the fifth pressure P5) in the liner 110 in a period from the winding step to a point in time before implementation of the curing step. This makes it possible to reduce a likelihood that the shape of the liner 110 will become smaller than the shape thereof during application of the maximum internal pressure so the fiber 32 is slack during implementation of the curing step.

According to the foregoing embodiment, the shape changing step is performed before the curing step to increase the shape of the liner 110 as shown in FIG. 3. By doing so, even if there is a slack in the fiber 32 wound on the liner 110, the fiber 32 is stretched in response to the change in shape of the liner 110 to allow reduction in an extent of the slack. Thus, the thermosetting resin is cured with a reduced extent of the slack in the fiber 32, namely, while the occurrence of deviation of a direction of winding of the fiber 32 from a direction designed in advance is reduced, thereby suppressing reduction in the strength (compressive strength, for example) of the tank 10.

According to the foregoing embodiment, the shape changing step includes the pressurizing step of increasing the shape of the liner 110 by increasing the internal pressure in the liner 110. This allows reduction in an extent of a slack in the fiber 32 wound on the liner 110. In particular, increasing the shape of the liner 110 by increasing the internal pressure in the liner 110 achieves size increase of the liner 110 (particularly, cylindrical section 111) more equally, thereby allowing an extent of a slack in the fiber 32 wound on the liner 110 to be reduced more uniformly. The shape changing step includes the axis direction deforming step of increasing the shape of the liner 110 in the axis direction. By increasing the shape of the liner 110 in the axis direction, the fiber 32 wound on the liner 110, particularly, the fiber 32 forming an inner layer near the liner 110 is displaced by friction in response to the deformation of the liner 110 to stretch the fiber 32 in a slack state. This allows reduction in an extent of the slack in the fiber 32. Further, increasing the shape of the liner 110 in the axis direction by the axis direction deforming step stretches the fiber 32 wound on the liner 110 by the low-angle helical winding in such a manner as to extend over the two dome sections 112, thereby allowing further reduction in an extent of the slack in the fiber 32.

Figure 5:
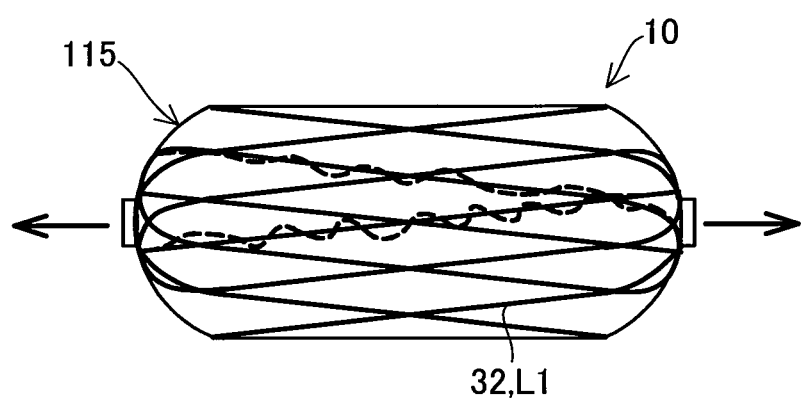
FIG. 5 is a view for describing an example of effect achieved by an axis direction deforming step.

FIG. 5 is a view for describing an example of effect achieved by the axis direction deforming step. If a first layer corresponding to an innermost layer L1 is formed by the low-angle helical winding and a second layer is formed by the high-angle helical winding or the hoop winding in the winding step, for example, and even if the fiber 32 forming the innermost layer L1 (fiber 32 indicated by dashes, for example) has a slack, increasing the shape of the liner 110 in the axis direction causes friction with the liner 110 to displace the fiber 32, allowing reduction in an extent of the slack in the fiber 32. By doing so, the occurrence of a step in the second layer is reduced during formation of the second layer, making it possible to suppress strength reduction of the tank 10 that might be caused due to the presence of a step in the second layer formed by the high-angle helical winding or the hoop winding. In this embodiment, this second layer corresponds to a layer to be subjected to application of maximum stress during pressurization after manufacture of the tank 10.

According to the foregoing embodiment, relaxing the fiber 32 once in the pressure reducing step after the fiber 32 is wound on the liner 110 allows reduction in pressure to be applied from one of parts of the fiber 32 overlapping each other to the other part of the fiber 32. This achieves reduction in frictional force between the parts of the fiber 32 overlapping each other. Thus, the fiber 32 wound on the liner 110 becomes ready to move more easily, making it possible to reduce an extent of a slack further in the fiber 32 wound on the liner 110 in the shape changing step. In particular, in the foregoing embodiment, the pressure reducing step is a step of reducing the internal pressure in the liner 110 to pressure lower than the internal pressure in the liner 110 at the time of winding of the fiber 32 to form a layer to be subjected to application of maximum stress after manufacture of the tank 10. In this way, predetermined fiber that is the fiber 32 to form the maximum stress layer is relaxed once to make the predetermined fiber ready to move easily. This allows reduction in an extent of a slack in the fiber 32 forming the layer to be subjected to application of maximum stress to achieve further suppression of strength reduction of the tank 10.

According to the foregoing embodiment, in the curing step corresponding to step S60, the thermosetting resin is heated and cured while the shape of the liner 110 is increased by maintaining the internal pressure in the liner 110 at the fifth pressure P5 higher than the internal pressure at the time of the winding step. Compared to increasing the shape of the liner 110 using a jig or the like, maintaining the internal pressure in the liner 110 at pressure higher than that at the time of the winding step achieves increase of the shape of the liner 110 more equally. As a result, an extent of a slack in the fiber 32 wound on the liner 110 is reduced further in curing the thermosetting resin. In particular, epoxy resin as the thermosetting resin liquefies and is then cured in response to temperature increase. Further, the liner 110 is softened by temperature increase to increase the shape of the liner 110 further by the action of internal pressure. In this way, the liner 110 is softened to increase the shape of the liner 110 further while the fiber 32 is made ready to move easily during liquefying of epoxy resin, making it possible to produce a state in which an extent of a slack in the fiber 32 forming a layer such as an inner layer is reduced further. By curing epoxy resin in this state, an extent of a slack in the fiber 32 is reduced further in the manufactured tank 10.

B. Other Embodiments

B-1. First Different Embodiment

In the foregoing embodiment, a preliminary pressurizing step of increasing the internal pressure in the liner 110 to pressure higher than that at the time of the winding step may be performed between the winding step and the pressurizing step. Performing the preliminary pressurizing step is preferable, particularly if the pressure reducing step is omitted. By doing so, even if the internal pressure in the liner 110 is reduced by the leakage of the inert gas as the gas from the liner 110 or by the increase of the volume of the liner 110 caused by temperature increase of the liner 110, the internal pressure in the liner 110 is still unlikely to become negative pressure. This reduces a likelihood of flow of air into the storage space 114 in the liner 110, making it possible to reduce the occurrence of oxidation of the liner 110.

B-2. Second Different Embodiment

The pressure reducing step performed in the foregoing embodiment is omissible. The shape changing step may include only the axis direction deforming step or the pressurizing step. Even in such cases, increasing the shape of the liner 110 by the shape changing step before the curing step stretches the fiber 32 in response to the change in the shape of the liner 110, allowing reduction in an extent of a slack.

This disclosure is not limited to the above-described embodiment but is feasible in the form of various configurations within a range not deviating from the substance of the disclosure. For example, technical features in the embodiment corresponding to those in each of the aspects described in SUMMARY can be replaced or combined, where appropriate, with the intention of solving some or all of the aforementioned problems or achieving some or all of the aforementioned effects. Unless being described as absolute necessities in this specification, these technical features may be deleted, where appropriate. The present disclosure may be implemented by aspects described below.

(1) According to a first aspect of this disclosure, a method of manufacturing a tank is provided. The method of manufacturing the tank includes: a winding step of winding a fiber impregnated with thermosetting resin before curing on a liner; a shape changing step of making the shape of the liner larger than the shape thereof at the time of the winding step, the shape changing step being performed after the winding step; and a curing step of heating and curing the thermosetting resin while the shape of the liner is increased by the shape changing step.

According to this aspect, the shape changing step is performed before the curing step to increase the shape of the liner. This allows reduction in an extent of a slack in the fiber wound on the liner, even if the slack occurs in the wound fiber. Thus, the thermosetting resin is cured with a reduced extent of the slack in the fiber, thereby suppressing reduction in the strength of the tank.

(2) In the foregoing aspect, the shape changing step may include a pressurizing step of increasing the shape of the liner by feeding gas into the liner and increasing internal pressure in the liner to pressure higher than the internal pressure in the liner at the time of the winding step.

According to this aspect, increasing the shape of the liner by increasing the internal pressure in the liner allows reduction in an extent of a slack in the fiber.

(3) In the foregoing aspect, a pressure reducing step may be provided further between the winding step and the shape changing step. In the pressure reducing step, the shape of the liner is made smaller than the shape thereof at the time of the winding step by reducing the internal pressure in the liner to pressure lower than the internal pressure in the liner at the time of the winding step.

According to this aspect, relaxing the fiber once in the pressure reducing step after the fiber is wound on the liner allows reduction in pressure to be applied from one of parts of the fiber overlapping each other to the other part of the fiber. This achieves reduction in frictional force between the parts of the fiber overlapping each other. Thus, the fiber wound on the liner becomes ready to move more easily, making it possible to reduce an extent of a slack further in the fiber wound on the liner in the shape changing step.

(4) In the foregoing aspect, the pressure reducing step may be a step of reducing the internal pressure in the liner to pressure lower than the internal pressure in the liner at the time of winding of the fiber to form a layer on the liner in the winding step, the layer being a layer to be subjected to application of maximum stress after manufacture of the tank.

According to this aspect, predetermined fiber that is the fiber to form the layer to be subjected to application of maximum stress is relaxed once to make the predetermined fiber ready to move easily. This allows reduction in an extent of a slack in the fiber forming the layer to be subjected to application of maximum stress to achieve further suppression of strength reduction of the tank.

(5) In the foregoing aspect, the shape changing step may include an axis direction deforming step of increasing the shape of the liner in an axis direction along an axis of the liner by applying external force to the liner.

According to this aspect, increasing the shape of the liner in the axis direction allows reduction in an extent of a slack in the fiber wound on the liner, particularly, the fiber forming an inner layer near the liner.

(6) In the foregoing aspect, in the curing step, the thermosetting resin may be heated and cured while the shape of the liner is increased by maintaining the internal pressure in the liner at pressure higher than the internal pressure in the liner at the time of the winding step.

According to this aspect, maintaining the internal pressure in the liner at pressure higher than that at the time of the winding step allows the shape of the liner to be increased more equally. As a result, an extent of a slack in the fiber wound on the liner is reduced further in curing the thermosetting resin.

This disclosure is feasible in various aspects. In addition to the foregoing method of manufacturing the tank, this disclosure is feasible in the aspects such as a device of manufacturing a tank, a fuel cell system equipped with a tank, etc.

What is claimed is:

1. A method of manufacturing a tank comprising:
    a winding step of winding a fiber impregnated with thermosetting resin before curing on a liner;
    a shape changing step of making the shape of the liner larger than the shape thereof at the time of the winding step, the shape changing step being performed after the winding step; and
    a curing step of heating and curing the thermosetting resin while the shape of the liner is increased by the shape changing step; and
    a pressure reducing step of making the shape of the liner smaller than the shape thereof at the time of the winding step by reducing the internal pressure in the liner to pressure lower than the internal pressure in the liner at the time of the winding step, the pressure reducing step being performed between the winding step and the shape changing step;
    wherein the shape changing step includes a pressurizing step of increasing the shape of the liner by feeding gas into the liner and increasing internal pressure in the liner to pressure higher than the internal pressure in the liner at the time of the winding step; and
    wherein the pressure reducing step is performed by exhausting gas from within the liner.

2. The method of manufacturing the tank according to claim 1, wherein
    the pressure reducing step is a step of reducing the internal pressure in the liner to pressure lower than the internal pressure in the liner at the time of winding of the fiber to form a layer on the liner in the winding step, the layer being a layer to be subjected to application of maximum stress after manufacture of the tank.

3. The method of manufacturing the tank according to claim 1, wherein
    the shape changing step includes an axis direction deforming step of increasing the shape of the liner in an axis direction along an axis of the liner by applying external force to the liner.

4. The method of manufacturing the tank according to claim 1, wherein
    in the curing step, the thermosetting resin is heated and cured while the shape of the liner is increased by maintaining the internal pressure in the liner at pressure higher than the internal pressure in the liner at the time of the winding step.

5. The method of manufacturing the tank according to claim 1, wherein the gas fed into the liner is inert gas.

6. The method of manufacturing the tank according to claim 1, wherein the winding step further comprises, feeding gas into the liner and thereby increasing the internal pressure in the liner in stages.

* * * * *